United States Patent [19]
Anderson

[11] 4,161,734
[45] Jul. 17, 1979

[54] POSITION SURVEILLANCE USING ONE ACTIVE RANGING SATELLITE AND TIME OF ARRIVAL OF A SIGNAL FROM AN INDEPENDENT SATELLITE

[75] Inventor: Roy E. Anderson, Schenectady, N.Y.

[73] Assignee: General Electric Company, Schenectady, N.Y.

[21] Appl. No.: 842,401

[22] Filed: Oct. 17, 1977

[51] Int. Cl.² ............................................. G01S 1/20
[52] U.S. Cl. ............................. 343/100 ST; 343/103; 343/112 R
[58] Field of Search ............. 343/112 R, 100 ST, 103, 343/6.5 R; 325/4

[56] References Cited
U.S. PATENT DOCUMENTS

| | | | |
|---|---|---|---|
| 3,384,891 | 5/1968 | Anderson | 343/100 ST |
| 3,544,995 | 12/1970 | Bottenberg et al. | 343/100 ST |
| 3,611,379 | 10/1971 | Deckett | 343/6.5 R |

*Primary Examiner*—Maynard R. Wilbur
*Assistant Examiner*—Lawrence Goodwin
*Attorney, Agent, or Firm*—Donald R. Campbell; Joseph T. Cohen; Marvin Snyder

[57] ABSTRACT

The position of a ship or other object being located is determined at an earth station using an active ranging satellite and a satellite which transmits time signals. One line of position is determined by two-way active ranging through the first satellite. The other line of position is determined by one-way ranging from the second satellite. The time interval between the time of arrival of the timing signal at the ship and reception of the active ranging signal at the ship is measured and sent back to the earth station with the ship's active ranging response. The position fix is then computed at the earth station.

12 Claims, 4 Drawing Figures

POSITION SURVEILLANCE USING ONE ACTIVE RANGING SATELLITE AND TIME OF ARRIVAL OF A SIGNAL FROM AN INDEPENDENT SATELLITE

BACKGROUND OF THE INVENTION

This invention relates to radio determination by artificial earth satellites, and more particularly to a method of position surveillance with one active ranging satellite and an independent satellite transmitting timing signals. For a position fix with altitude, an additional satellite transmitting timing signal is needed.

To locate a maritime or land vehicle on the surface of the earth by range measurements, two satellites are required. Radio signals travel at the velocity of light, and range is determined from the free space propagation time delay of a timing or ranging signal transmitted by a satellite and received on the vehicle. Knowing the satellite locations, a line of position for the vehicle from each satellite can be computed, the position fix being at the intersection of the two lines of position. The fact that two satellites are required is frequently given as an objection when it is suggested that communications satellites be used for radio determination, which is defined as position fixing by the use of radio signals. The present invention overcomes that objection by requiring only one active ranging (and communications) satellite. The function of the second satellite is fulfilled by any other independent satellite that is transmitting timing signals, such as a standard time distribution satellite, and is in orbit for reasons that are entirely independent of the surveillance system. It does not have to receive and retransmit any signals specifically for the position fixing system.

The invention makes it attractive to implement position surveillance, i.e., tracking the position of a vehicle or craft at a fixed earth station, at an early date with existing or contemplated satellites. Some applications are monitoring the positions of oil tankers and other vessels with dangerous cargoes to help prevent mishaps and protect the enviroment; aid the effective monitoring of foreign vessels within the newly assigned 200 mile limit, transoceanic aircraft surveillance for traffic control; aid commercial shipping navigation and ship position monitoring from the shore; and land mobile vehicle position monitoring, as for law enforcement. The technique can provide worldwide service, high accuracy can be achieved, and costs are modest as compared to other proposed systems.

Navigation and position surveillance by another method involving measurement of the time of arrival of signals from two timing satellites by an onboard crystal clock, with correction of the clock by an occasional two-way active range measurement, is disclosed and claimed in concurrently filed application Ser. No. 842,402 by the inventor, assigned to the same assignee as this invention. Various active and passive one-way and two-way ranging techniques are also described in the inventor's U.S. Pat. No. 3,384,891, which was granted on May 21, 1968 and is assigned to the same assignee.

SUMMARY OF THE INVENTION

The method of position surveillance with an active ranging satellite and a second independent satellite that transmits timing signals comprises, in an exemplary embodiment, receiving a timing signal at both a fixed earth station and at the ship, aircraft, land vehicle, or other object being located. A two-way active range measurement is performed immediately after reception of the timing signal at the earth station, or at a known interval after reception, by transmitting an active ranging signal from the earth station through the active ranging satellite to the object and back, and measuring at least the two-way ranging time between transmission and reception of the ranging signal at the earth station. The range to the object from the active ranging satellite can be determined from such information. Data from which the range to the object from the timing signal satellite can be determined is obtained by measuring the time of arrival of the timing signal at the object relative to reception of the active ranging signal at the object and deriving the elapsed time interval therebetween. The elapsed time interval is transmitted to the earth station, usually following the active ranging response, and is supplied to a computer along with satellite and earth station position data and also the active ranging data for computation of the position fix.

Range from timing satellite to object is calculated from the range between timing satellite and earth station, range between earth station and ranging satellite, range between ranging satellite and object, and the elapsed time interval measured at the object. Knowing the location in space of the timing signal satellite and the range to the object, a first line of position is determined; and knowing the location of the active ranging satellite and range to the object, a second line of position is determined. The position fix is at the intersection of the two lines of position for the object. A modification is that a second timing signal satellite, making a total of three satellites, is required for a position fix with altitude as well as longitude and latitude.

The timing signal satellites are preferably standard time distribution satellites such as the GOES or the planned WWVS satellites that transmit signals at regular intervals. At the object, a time interval counter is started and reset to zero after each regular interval unless stopped by a received active ranging signal.

DESCRIPTION OF THE PREFERRED EMBODIMENTS

The position of a distant object is determined at an earth station by range measurements to the object from two artificial satellites whose position in space are known, and only one satellite need be an active ranging and communications satellite. One line of position for the object to be located is determined by two-way active ranging through the one satellite. The other line of position is determined by one-way ranging from a second satellite which need only transmit signals from which timing information can be derived. One-way ranging is accomplished by measuring, at the object, the time of arrival of the signal from the second satellite relative to the active ranging interrogation and sending the measurement back to the earth station together with the object's active ranging response. The position of the object as to longitude and latitude is then computed at the earth station. The object being located can be a sea-going ship, an aircraft, a weather balloon, an ocean buoy, a truck or land vehicle, or even a person, providing the user has appropriate electronic equipment, which for this application can be automatic and unmanned. In the following description the object being located and tracked by the surveillance system is assumed to be an ocean-going ship.

Figure 1:
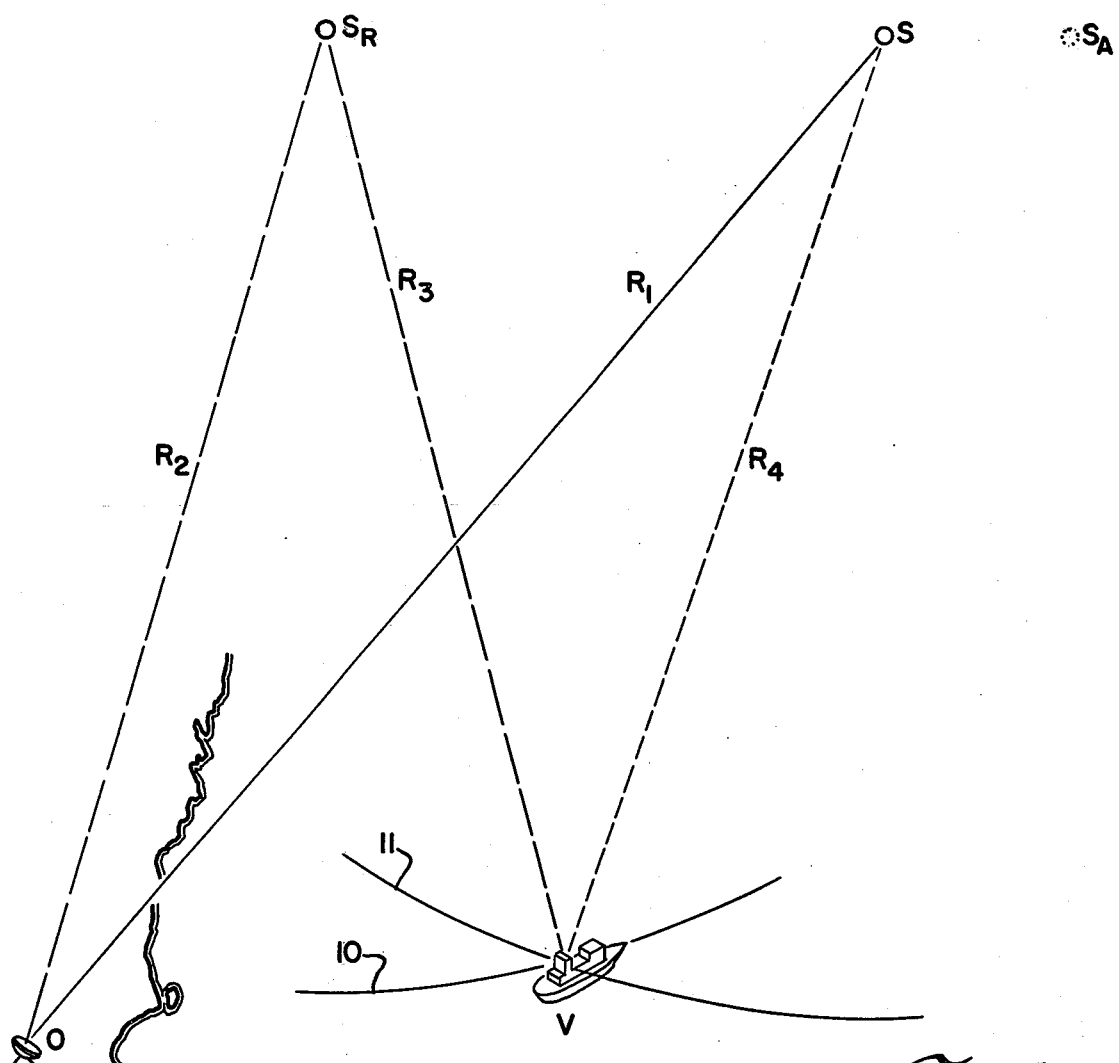
FIG. 1 is a sketch illustrating position surveillance with one active ranging satellite and one timing signal satellite, and also shows a second timing signal satellite for a position fix with altitude.

The preferred embodiment for position surveillance in FIG. 1 utilizes an active ranging satellite $S_R$ and a timing signal satellite S. The satellite for active ranging is normally a communications satellite, since it is appreciated that ship communication by satellite is desirable to conduct business, transmit weather forecasts and emergency information, etc. Timing signal satellite S is preferably a geostationary satellite that relays standard time signals as the National Bureau of Standard now does through the GOES satellites, and is considering doing through a future WWVS satellite. The GOES time signals are transmitted with a very narrow bandwidth and may not provide the resolution that is required for accurate ship surveillance, but the contemplated service designated WWVS which the National Bureau of Standards is considering for distribution of timing signals by satellite will provide high accuracy and high precision timing signals that will be available continuously and as conveniently as the GOES signals are now. The timing satellites have transponder equipment for receiving and transmitting a digital timing code having a time marker that can be used to measure time of arrival of the signals at the user vessel. The invention can be realized with any signal waveform which can transmit an identifiable timing signal, and for clarity the timing signals are referred to as "time ticks" occurring at precisely measured one second intervals. Satellite S is a "satellite of convenience" and is one that is in orbit for reasons that are entirely independent of the surveillance system, such as a time distribution or data relay satellite, and does not have to receive and retransmit any signals specifically for the position fixing system.

The vessel being located is designated as V, and O represents a fixed earth or ground station at a precisely known location. The positions in space of ranging satellite $S_R$ and timing satellite S are also knonw, so that range $R_1$ between the timing satellite and earth station and range $R_2$ between the earth station and active ranging satellite are established. The two-way active range measurement on the ship determines range $R_3$ from the active ranging satellite to the ship. Knowing the position in space of active ranging satellite $S_R$ and the range to the ship, a first line of position 10 for the ship can be calculated. One-way ranging from timing signal satellite S determines range $R_4$ from the timing satellite to the ship. Knowing the location in space of timing satellite S and the range to the vessel, a second line of position 11 for the ship can be calculated. Each line of position is actually a segment of a circle on the surface of the earth having a center on a line extending between the satellite and the center of the earth. The intersection of lines of position 10 and 11 is the position fix of the vessel.

To perform the method of position surveillance, a time signal or "time tick" is transmitted by satellite S at time $T_S$, and is received at earth station O and vessel V. In response to reception of the timing signal at the earth station, either immediately or after a known time delay, an active ranging interrogation is initiated at the earth station. The high accuracy tone-code ranging technique is preferred, but any technique that can transmit a time marker on a radio signal is suitable including pseudo-random ranging and mutliple side tone ranging. Tone-code ranging is described in the article "Communications and Position Fixing Experiments Using the ATS Satellites" by the inventor, *Navigation*, Vol. 20, No. 4, Winter 1973-1974. The active ranging signal containing the ship's address and originating at earth station O is relayed by transponder equipment on satellite $S_R$ to ship V, and then is retransmitted from the ship through satellite $S_R$ back to earth station O. At the ground station, the time interval in microseconds and tenths of microseconds or in nanoseconds is measured from the initial transmission of the ranging interrogation to its return from the satellite as relayed back from the ship. The elapsed time interval is twice the ranging time from earth station to satellite plus twice the ranging time from satellite to ship. Knowing the exact locations of earth station O and satellite $S_R$, the ranging time from earth station to satellite is also known and can be subtracted off and the result divided by 2 to give the one-way ranging time from satellite $S_R$ to ship V. The vessel receives the active ranging signal from O at time $T_{VO}$. The vessel had previously received the timing signal from S at $T_{VS}$. Automatic equipment on the ship measures the time from $T_{VS}$ to $T_{VO}$ in microseconds and tenths of microseconds or in nanoseconds, and sends the measurement as a data message back through satellite $S_R$ following its response to the ranging signal. As shown by FIG. 1 and the following mathematical expressions, the ground station then has all the information needed to compute the ranges from active ranging satellite $S_R$ and timing signal satellite S to the ship and hence to determine its location.

$$T_{VO} = T_S + \frac{R_1 + R_2 + R_3}{C} \tag{1}$$

where C = velocity of light, range $R_1$ is known from tracking S, and time intervals $R_2/C$ and $R_3/C$ are known from the two-way active range measurement.

$$T_S = T_{VO} - \frac{R_1 + R_2 + R_3}{C} \tag{2}$$

Also, $$T_{VS} = T_S + \frac{R_4}{C} ; \frac{R_4}{C} = T_{VS} - T_S. \tag{3}$$

Then, $$\frac{R_4}{C} = T_{VS} - (T_{VO} - \frac{R_1 + R_2 + R_3}{C}) \tag{4}$$

$$= \frac{R_1 + R_2 + R_3}{C} - (T_{VO} - T_{VS}) \tag{5}$$

But $T_{VO} - T_{VS} = X$ is the time interval measured on the vessel and returned as data during the ranging interrogation.

$$R_4 = R_1 + R_2 + R_3 - CX \tag{6}$$

A modification of the method of position surveillance employing two satellites, one of which is a timing signal satellite, is that a second timing signal satellite $S_A$, illustrated in dashed lines in FIG. 1, is needed when the position fix for the vessel includes altitude as well as longitude and latitude. Airborne objects being located such as an aircraft or balloon often have an altimeter or other instrument for independently determining altitude, but this can be done by one-way ranging from satellites S and $S_A$ and two-way ranging from active ranging satellite $S_R$ and computing a line of position from each, the intersection of the three lines of position being the position fix. The time of arrival of a timing signal from satellite $S_A$ is measured at the ship relative to reception of the active ranging interrogation from satellite $S_R$. Thus, the range from the second timing signal satellite to the vessel can be calculated at the earth station. For further information on ranging measurements for a position fix for altitude as well as longitude and latitude, two-way active ranging measurements by satellite, and appropriate electronic equipment at the ground station, satellite and user craft to make these measurements, refer to the previously mentioned U.S. Pat. No. 3,384,891, the disclosure of which is incorporated herein by reference. In the foregoing discussion, internal time delays in the electronic equipment and logic have not been mentioned, but such delays are known, can be estimated, or can be measured. Automatic and remote measurement of the internal time delay of an unmanned transponder is described in allowed application Ser. No. 562,499 filed on Mar. 27, 1977, now U.S. Pat. No. 4,042,926, by the inventor jointly with J. R. Lewis and A. F. Briskin, entitled "Automatic Transponder" and assigned to the National Aeronautics and Space Administration. Precision range measurements and position fixes necessitate that correction be made for internal time delays as is known in the art.

Figure 2:
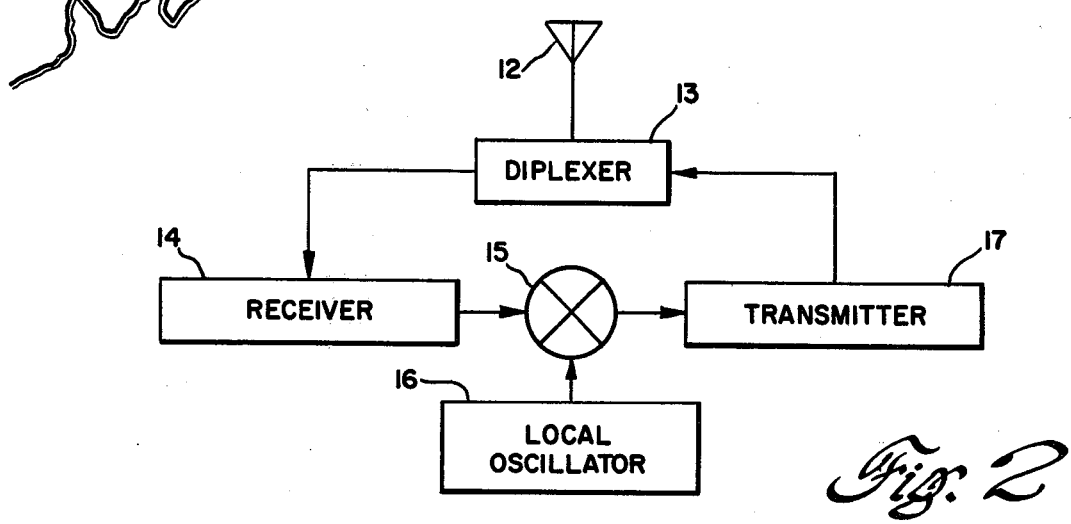
FIG. 2 is a schematic block diagram of a satellite transponder.
Figure 3:
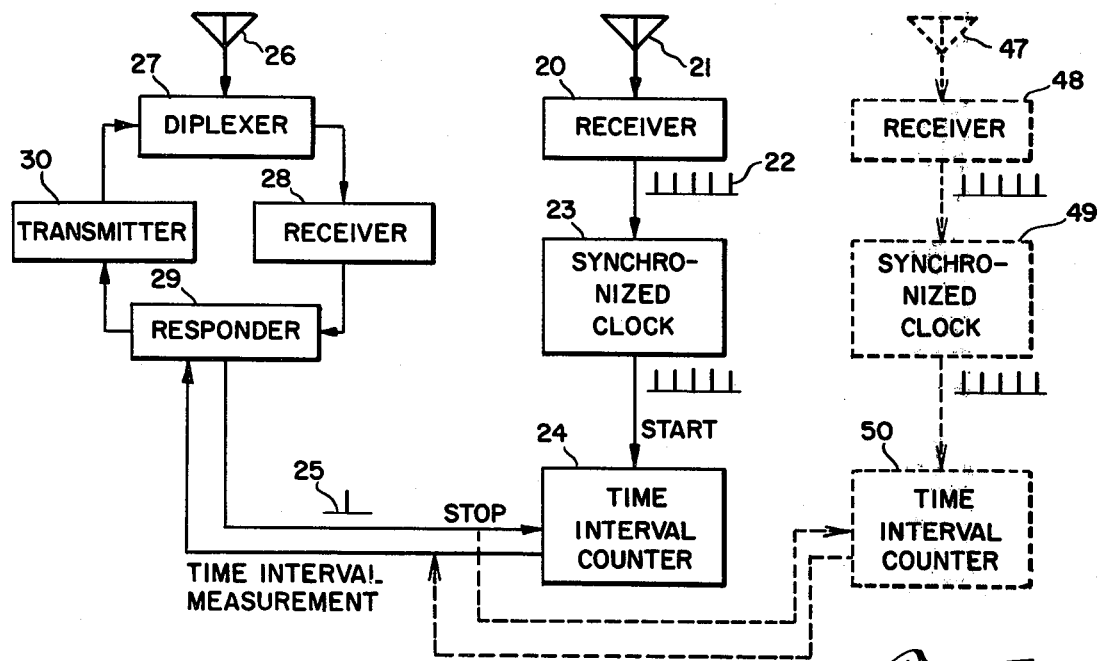
FIG. 3 is a block diagram of user electronic equipment on the ship or other object being located.
Figure 4:
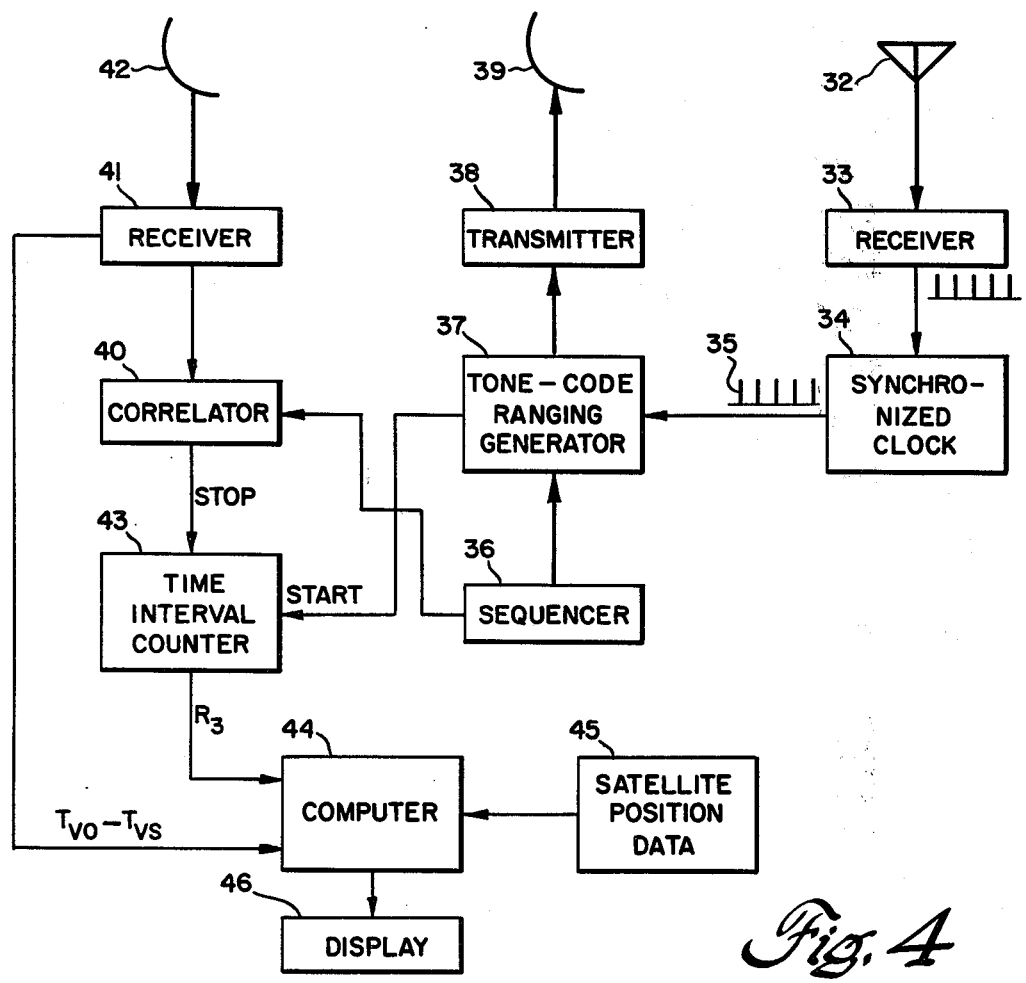
FIG. 4 is a block diagram of the earth station electronic equipment.

FIGS. 2, 3, and 4, are block diagrams of typical electronic equipment on the satellite, on shipboard, and at the earth station in order to practice the present methods of position surveillance by satellite. The basic transponder apparatus on a timing signal satellite or an active ranging satellite for receiving a digital time code or active ranging interrogation and immediately transmitting the radio signal is given in FIG. 2. The incoming radio signal is received by an antenna 12, passes through a diplexer 13 to a receiver 14, and is then combined in a mixer 15 with an intermediate frequency generated by a local oscillator 16. The mixer output signal has a different frequency than the received signal and passes through a transmitter 17 back to diplexer 13 and antenna 12 to be radiated.

FIG. 3 illustrates in simplified form the electronic system aboard ship for position surveillance at convenient intervals utilizing one active ranging and one timing signal satellite, further showing in dashed lines the additional apparatus required for a position fix including altitude. This equipment can be unmanned. A receiver 20 with an antenna 21 receives the timing signals from satellite S, transmitted at one second intervals or other regular time intervals. The train of timing pulses or time ticks 22 occurring at one second intervals are fed to a synchronized clock 23 which, because of integration over a number of time ticks, produces a more precisely defined train of timing pulses synchronized with those out of the receiver. A time interval counter 24 is started by each timing pulse from the synchronized clock, and if no active ranging interrogation is received from satellite $S_R$, the counter returns to zero and starts over at each tick. When a ranging interrogation signal is received at the vessel, the time marker or pulse 25 in the received ranging signal stops operation of time interval counter 24. The usual routing of a tone-code ranging signal relayed by $S_R$ is that it is received by antenna 26 and passes through diplexer 27 and receiver 28 to a responder 29. The responder automatically initiates retransmission of the ranging signal through transmitter 30, diplexer 27, and antenna 26. By this invention, the active ranging signal containing time marker 25 is also fed from responder 29 to time interval counter 24. The elapsed time interval that is measured is $(T_{VO}-T_{VS})$ in equation (5), and is the interval between the time of arrival of a timing signal at the vessel and the arrival of the active ranging signal at the vessel. This time interval is fed out of counter 24 to responder 29 and is sent as a digital message immediately after the tone-code ranging response of the vessel.

The timing signals transmitted by timing satellite S at regular intervals are also received at the earth station, and the two-way active range measurement is initiated in response to reception of a timing signal, either immediately or at a known time delay after reception. In FIG. 4, timing signals received by antenna 32 are fed to a receiver 33 and then to a synchronized block 34, the output being a train of timing pulses 35 generated at regular time intervals such as one per second. When a position fix for a vessel being monitored is to be made, a sequencer 36 for rotating the tone-code ranging interrogations among a number of vessels to be located actuates a tone-code ranging generator 37 to produce, immediately in response to a timing pulse 35 or time-of-arrival signal fed to the generator from synchronized clock 34, a digital timing code which includes the time marker and also the address of ship V. This ranging interrogation passes through a transmitter 38 to a tracking antenna 39. In practice, sequencer 36 is free running and the tone-code active ranging signal is generated at an arbitrary time after receipt of a timing pulse 35, but this makes no difference so long as the time interval between the timing pulse and active ranging signal is measured and then subtracted from the elapsed time interval measured on the ship. Sequencer 36 also actuates a correlator 40 associated with a receiver 41 which functions to recognize the address in the active ranging response transmitted from the ship through active ranging satellite $S_R$ back to a tracking antenna 42 at the earth station.

The tone-code ranging interrogation is also fed to a time interval counter 43 and the time marker starts operation of the counter. The retransmitted tone-code ranging interrogation signal relayed by $S_R$ back to the earth station is received by antenna 42 and passes through receiver 41 to correlator 40 where the address is recognized. The time marker in the received active ranging signal stops operation of time interval counter 43, and the elapsed time interval in microseconds and tenths of microseconds or nanoseconds represents the two-way active ranging time. This information is supplied to a computer 44. Knowing the positions of earth station O and ranging satellite $S_R$, or knowing the time for the active ranging signal to travel from O to $S_R$ and return, range $R_2$ is calculated. Since the two-way travel time for the active ranging signal has been measured and $R_2$ is known, range $R_3$ between satellite $S_R$ and ship V is determined. The active ranging response passing through receiver 41 also includes the elapsed time interval measured at the ship between the time of arrival of a timing signal and reception at the ship of the active ranging signal. The interval $T_{VO} - T_{VS}$ is supplied directly from receiver 41 to computer 44, along with satellite position data from a memory unit 45, so that the computer now has all the information needed to calculate the position fix. Standard time distribution satellites such as the GOES or WWVS satellite are tracked by the owners who can thus transmit ephemeris data, i.e., information on orbital parameters from which the satellite position can be determined, or can transmit position in longitude, latitude, and earth center distance. Alternatively, the satellite position data can be computed at the earth station by trilateration. In trilateration the ranges from three widely spaced ground stations, two of which can be unmanned, are determined, and the unique satellite position is computed from the three ranges and the known locations of the ground stations. Range $R_3$ is determined from the two-way active range measurement, and range $R_4$ is computed from equation (6). Knowing the location in space of satellite $S_R$ and the range to the ship, line of position 10 is computed by routine calculations, and knowing the location in space of satellite S and the range to the ship, line of position 11 is computed. The intersection of lines of position 10 and 11 is the position fix of vessel V. A display device 46 such as a cathode ray tube or printer provides a visual display of the ship's position. There is an ambiguity with geostationary satellites in that two fixes are determined, one in the northern and one in the southern hemisphere. A priori knowledge of the hemisphere in which the vessel is located resolve that ambiguity. Using a PDP-11 minicomputer manufactured by Digital Equipment Corp., the computer will complete the computation and start printing out the position of the ship in latitude or longitude well within one second after the ranging interrogation is received from the ship. Individual position fixes within an accuracy of 0.1 nautical mile can be made at the rate of one every two or three seconds, or at longer intervals as may be required.

A total of three earth orbiting satellites including a second timing signal satellite $S_A$ is required for position fixes including latitude, longitude, and altitude. The shipboard apparatus in this case includes (see FIG. 3) another antenna 47, receiver 48, and synchronized clock 49 for generating a train of timing pulses at regular intervals representing the time of arrival of signals from the second timing satellite. As before, the timing pulses, one each second or other regular interval, start a time interval counter 50, and if no ranging interrogation is received from $S_R$, the counter returns to zero and starts over at each time tick. When a ranging interrogation is received, the counter is stopped by the time marker 25 in the active ranging signal, and the elapsed time interval from timing pulse to reception of the active ranging signal is sent as a digital message along with the active ranging response of the vessel. Having computed $R_4$, the earth station now has all the information needed to compute a third line of position for the vessel.

In summary, the method of position surveillance for a ship, aircraft, land vehicle, or other object being located requires only one active ranging (and communications) satellite, and the other is a standard time distribution satellite or any other independent satellite transmitting timing signals at regular intervals. Two timing signal satellites are needed for a position fix including altitude. One line of position is determined by active ranging, and the other line or lines of position from measuring the time of arrival of signals from the timing satellite relative to reception of the active ranging signal at the object being located. The position fix of the object is computed at an earth station.

While the invention has been particularly shown and described with reference to preferred embodiments thereof, it will be understood by those skilled in the art that the foregoing and other changes in form and details may be made therein without departing from the spirit and scope of the invention.

The invention claimed is:

1. A method of position surveillance using a plurality of satellites having known locations and including a first satellite that transmits timing signals, comprising the steps of receiving at an object to be located and at a fixed earth station the timing signal transmitted by said first satellite, performing a two-way active range measurement after reception of said first satellite timing signal at the earth station by transmitting an active ranging signal from the earth station through a second satellite to the object and back, to thereby derive the ranging time between said second satellite and object, measuring the time of arrival of said first satellite timing signal at the object relative to reception of said active ranging signal at the object and deriving the elapsed time interval therebetween, and transmitting said elapsed time interval to the earth station, computing at the earth station the position fix of said object from the known locations of said first and second satellites and earth station, the elapsed time interval measured at the object, and the ranging time between said second satellite and object, and displaying the position fix so obtained.

2. The method of claim 1 wherein the step of performing a two-way active range measurement comprises measuring at least the two-way ranging time between transmission and reception of said active ranging signal at the earth station, and wherein the elapsed time interval measured at the object is transmitted through said second satellite to the earth station following retransmission of said active ranging signal from the object through said second satellite to the earth station.

3. The method of claim 2 wherein the step of computing the position fix of said object comprises computing a first line of position of the object from the known location of said second satellite and the range from said second satellite to the object, and computing a second line of position of said object from the known location of said first satellite and the range from said first satellite to the object, the last-mentioned range being derived from the ranges to said first and second satellites from the earth station, the range from said second satellite to the object, and the elasped time interval measured at the object, and determining the position fix at the intersection of said first and second lines of position.

4. The method of claim 2 wherein said first satellite is a time distribution satellite transmitting said timing signals at precise regular intervals, and said active ranging signal has a time marker, and the step of measuring the time of arrival of said timing signal relative to reception of said active ranging signal at the object is comprised by starting and stopping a time interval counter with a sequentially received timing signal and ranging signal time marker.

5. The method of claim 1 further including a third satellite that transmits timing signals simultaneous with the transmission of timing signals from said first satellite, and further including the steps of receiving at the object the timing signal transmitted by said third satellite, measuring a second elapsed time interval between the time of arrival of said third satellite timing signal at the object and reception of said active ranging signal at the object, and transmitting said second elapsed time interval to the earth station.

6. A method of position surveillance using first and second satellites having known locations comprising the steps of receiving at an object to be located and at a fixed earth station a timing signal transmitted by said first satellite, performing a two-way active range measurement after reception of said timing signal at the earth station by transmitting an active ranging signal from the earth station through said second satellite to the object and back through said second satellite to the earth station, and measuring at least the two-way ranging time between transmission and reception of said active ranging signal at the earth station, measuring the time of arrival of said timing signal at the object relative to reception of said active ranging signal at the object and deriving the elapsed time interval therebetween, and transmitting said elapsed time interval through said second satellite to the earth station, and supplying at least the two-way ranging time, the elapsed time interval measured at the object, and data on the locations of said first and second satellites and earth station to a computer for computation of the position fix of the object to be located.

7. The method of claim 6 wherein said first satellite transmits timing signals at regular intervals and wherein said active ranging signal has a time marker, and the step of measuring the time of arrival of said timing signal relative to reception of said active ranging signal is comprised by starting and stopping a time interval counter with a sequentially received timing signal and ranging signal time marker.

8. The method of claim 6 wherein said first satellite is a time distribution satellite transmitting timing signals at precise regular intervals and said second satellite is an active ranging and communications satellite, and wherein said active ranging signal has a time marker, and the step of measuring the time of arrival of said timing signal relative to reception of said active ranging signal at the object is comprised by repeatedly starting a time interval counter with said timing signals at regular intervals and stopping said counter with the ranging signal time marker when an active ranging signal is received to thereby generate said elapsed time interval.

9. A method of position surveillance using a plurality of satellites having known locations and including a timing signal satellite that transmits timing signals at precisely known intervals, comprising the steps of receiving at an object to be located and at a fixed earth station the timing signal transmitted by said timing signal satellite, performing a two-way active range measurement in response to reception of said timing signal at the earth station by transmitting an active ranging signal through an active ranging satellite to the object and back through said active ranging satellite to the earth station, and measuring at least the two-way ranging time between transmission and reception of said active ranging signal at the earth station to thereby derive the range from said second satellite to the object, measuring the time of arrival of said timing signal at the object relative to reception of said active ranging signal at the object and deriving the elapsed time interval therebetween, and transmitting the elapsed time interval through said active ranging satellite to the earth station, computing a line of position of the object with respect to said active ranging satellite from the known locations of said earth station and active ranging satellite and the one-way ranging time from said active ranging satellite to the object, computing a line of position of the object with respect to said timing signal satellite from the known locations of said active ranging and timing signal satellites and earth station, the elapsed time interval measured at the object, and the range from said active ranging satellite to the object, determining the position fix of said object at the intersection of said lines of position, and displaying the position fix so obtained.

10. The method of claim 9 wherein the step of performing a two-way active range measurement comprises transmitting said active ranging signal after reception of said timing signal at the earth station, and wherein the step of transmitting the elapsed time interval measured at the object to the earth station is performed following retransmission of said active ranging signal from the object through the active ranging satellite to the earth station.

11. The method of claim 10 wherein said active ranging signal has a time marker, and the step of measuring the time of arrival of said timing signal relative to reception of said active ranging signal at the object is comprised by starting a time interval counter with said timing signal and stopping said counter with the ranging signal time marker to thereby generate said elapsed time interval.

12. The method of claim 10 wherein said timing signal satellite is a time distribution satellite transmitting timing signals at regular intervals, and said active ranging signal has a time marker, and the step of measuring the time of arrival of said timing signal relative to reception of said active ranging signal at the object is comprised by repeatedly starting a time interval counter with said timing signals at regular intervals and stopping said counter with the ranging signal time marker when said active ranging signal is received at the object to thereby generate said elapsed time interval.

* * * * *